United States Patent
Remmer et al.

(10) Patent No.: US 9,107,427 B2
(45) Date of Patent: Aug. 18, 2015

(54) METHOD FOR OPERATING A POULTRY DEFEATHERING APPARATUS AND A PICKING BANK FOR USE IN A POULTRY DEFEATHERING APPARATUS

(75) Inventors: Michael Remmer, Trige (DK); Ole Bach, Trige (DK); Poul Kjeldsen, Trige (DK); Uffe Thrane, Trige (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 14/388,547

(22) PCT Filed: Mar. 28, 2012

(86) PCT No.: PCT/DK2012/050095
§ 371 (c)(1),
(2), (4) Date: Jan. 2, 2015

(87) PCT Pub. No.: WO2013/143539
PCT Pub. Date: Oct. 3, 2013

(65) Prior Publication Data
US 2015/0133040 A1    May 14, 2015

(51) Int. Cl.
*A22C 25/02* (2006.01)
*A22C 21/02* (2006.01)

(52) U.S. Cl.
CPC .............. *A22C 21/02* (2013.01); *A22C 21/022* (2013.01)

(58) Field of Classification Search
USPC ............................................. 452/71, 86–93
See application file for complete search history.

(56) References Cited

U.S. PATENT DOCUMENTS

| 3,596,309 A | | 8/1971 | Vertegaal |
| 3,665,539 A | * | 5/1972 | Dillon ............................. 15/88.3 |
| 3,716,892 A | | 2/1973 | Miles et al. |
| 3,797,068 A | * | 3/1974 | Dillon ............................. 452/76 |

(Continued)

FOREIGN PATENT DOCUMENTS

| EP | 1 297 748 A1 | 4/2003 |
| GB | 1226317 | 3/1971 |
| WO | 2007071236 A1 | 6/2007 |

OTHER PUBLICATIONS

International Search Report of PCT/DK2012/050095 dated Dec. 6, 2012.

(Continued)

*Primary Examiner* — Richard Price, Jr.
(74) *Attorney, Agent, or Firm* — Sughrue Mion, PLLC

(57) ABSTRACT

The invention relates to a method for operating a poultry defeathering apparatus, where a drive mechanism is used for rotating a plurality of picking heads of a picking bank and to such a picking bank. Each picking head is mounted at an outer side of a cover member on an axle projecting through an opening in the cover member and supported by a bearing. The drive mechanism is arranged on an inner side of the cover member opposite the picking heads. To protect the drive mechanism from deterioration, a gas or air is caused to flow along an inlet path on the inner side of the cover member and onwards to the drive mechanism. The gas or air has a lower relative humidity than the air surrounding the picking heads, when the apparatus is in operation, thus ventilating any moisture entering the picking bank away. To further reduce the ingress of water it is preferred that the flow of gas or air is so as to cause an over-pressure on the inner side of the cover member, which is, preferably at all times, higher than the pressure on the outer side.

15 Claims, 3 Drawing Sheets

(56) References Cited

U.S. PATENT DOCUMENTS

| | | | |
|---|---|---|---|
| 4,175,302 A | 11/1979 | Scheier et al. | |
| 4,199,842 A | 4/1980 | Bergeron | |
| 4,514,879 A | 5/1985 | Hazenbroek | |
| 4,868,950 A * | 9/1989 | Harben, Jr. | 452/77 |
| 5,853,320 A | 12/1998 | Wathes et al. | |
| 7,175,516 B2 | 2/2007 | Clarke | |
| 2003/0139129 A1 | 7/2003 | Clarke | |

OTHER PUBLICATIONS

English Translation for EP 1297748 of record, Apr. 2, 2003.

* cited by examiner

1

METHOD FOR OPERATING A POULTRY DEFEATHERING APPARATUS AND A PICKING BANK FOR USE IN A POULTRY DEFEATHERING APPARATUS

CROSS REFERENCE TO RELATED APPLICATIONS

This application is a National Stage of International Application No. PCT/DK2012/050095 filed Mar. 28, 2012, the contents of which are incorporated herein by reference in its entirety.

BACKGROUND OF THE INVENTION

1. Field of the Invention

The present invention relates to a method for operating a poultry defeathering apparatus, where a drive mechanism is used for rotating a plurality of picking heads, and to a picking bank comprising at least one cover member, a plurality of picking heads and a drive mechanism for rotating the picking heads, each of said picking heads being mounted at an outer side of the cover member on an axle projecting through an opening in the cover member, said axle being supported by a bearing, and said drive mechanism being arranged on a inner side of the cover member opposite the picking heads.

2. Background

Such poultry defeathering apparatuses have been known for decades, but have been the subject of continuous development, a recent example of an improved apparatus being described in the applicants own patent application WO2007071236.

The overall construction of the picking banks with rotating picking heads driven via axles projecting through a cover member, typically in the form of a housing enveloping at least a part of the drive mechanism, has remained largely unchanged. Accordingly, the need for protecting the drive mechanism and particularly the axle bearings, which must work constantly under very tough conditions, including the exposure to water, feathers and sand dust, and for preventing feathers and dirt from building up inside the picking bank, has long been recognized. Sand dust and small feathers measure only micro millimeters and can penetrate the smallest clearance and enter the internal of the picking bank. This effect is enhanced by the usage of large amounts of water on the outside front of the picking banks to assist the feather removal, since moisture will follow the sand dust and feathers and cause bearings to rust, thereby reducing their lifetime considerably.

Examples of solutions to these challenges are found in U.S. Pat. No. 4,175,302, which discloses the use of a sleeve around the axle, and in U.S. Pat. No. 7,175,516, which teaches the use of a set of three seals at each axle. The inventions in these two publications, which represent a span of 25 years of development within this field, and other like them function very well in theory, but in practice they lack the robustness desired in modern poultry processing industries. As also explained in U.S. Pat. No. 4,175,302, fine feathers are able to penetrate into the smallest of openings and are surprisingly abrasive, thus causing the need for frequent maintenance and repair, and this remains a problem even when the prior art solutions have been applied. Particularly the axle seals will wear out over a short period of time due, not least due to an often high content of sand dust in the feathers, and it is both time consuming and expensive to replace them. Moreover, attempts to clean the inside of picking banks have been know to in itself result in damage to the mechanical parts, bearings and seals.

SUMMARY OF THE INVENTION

It is therefore a first object of the present invention to provide a method for operating a poultry defeathering apparatus and a second object to provide a picking bank for a poultry defeathering apparatus, where deterioration of the drive mechanism and other mechanical parts is minimized even further.

This first object is achieved with a method where a gas or air is caused to flow along an inlet path on the inner side of the cover member and onwards to the drive mechanism, and where the gas or air has a lower relative humidity than the air surrounding the picking heads, when the apparatus is in operation.

The second object is achieved with a picking bank comprising one or more flow inducers adapted for directing gas or air along an inlet path on the inner side of the cover member towards the drive mechanism and where an intake adapted for leading gas or air to the one or more flow inducers is directed away from the picking heads.

The term "flow inducer" is here understood as meaning any device capable of producing a flow along the inlet path, be it an active component such as ventilator or a compressor producing a pressure difference, which drives the flow, or a passive device such as a deflector, which directs an existing flow generated elsewhere in a desired direction.

In the prior art it has always been accepted that the only way of protecting the drive mechanism is to keep moisture, feathers and dirt away from it. The present invention represents a breakaway from this line of thought by ventilating instead of sealing. Using gas or air with a lower relative humidity than the air surrounding the picking heads when the apparatus is in operation ensures that moisture penetrating into the picking bank during normal operation can be ventilated away in stead of building up on the inner side of cover member. Any dirt entering the system will not stick due to the relatively dry conditions, but will instead be gradually blown out of the system by the gas or air.

During normal operation the area around the picking head will normally be characterized by a very high humidity due to the poultry having been scalded with hot water prior to defeathering, and the intake adapted for leading gas or air to the one or more flow inducers is therefore directed away from there. In the rare event that other areas of a slaughterhouse are equally or even more humid, the intake leading to the flow inducer(s) should also not be located there.

Having accepted a certain ingress of moisture, there is no longer a need for tight fits between all parts of the picking bank, which therefore does not need to be of the same high quality with regards to sealing. This involves the added benefit that the abrasive properties of feathers also become even less of a problem, since there are less tight joints where feathers can become caught.

In an advantageous embodiment the flow of gas or air is adapted to causing an over-pressure on the inner side of the cover member, meaning that the pressure inside the picking bank is, preferably at all times, higher than the pressure on the outer side. In this way dirt, feathers and water will effectively be prevented from penetrating into the picking bank. An overpressure of 200-250 mbar on the inner side is presently considered to be advantageous and the gas or air preferably passes along the cover member at 10-25 m/s.

It has also proven advantageous to provide a small clearance around the axle shafts so that part of the gas or air may escape this way. When there is an overpressure on the inner side and/or the speed and direction of the gas or air is right, this results in the creation of a small gas or air flow around each shaft in the opposite direction of the potential ingress of dirt, feathers and water, thereby preventing these from entering the picking bank.

The ventilation of the inner side and the possible use of an overpressure has the added advantage that the growth of bacteria on the picking bank is prevented or at least reduced. An over-pressure prevents organic material originating from the bird from accumulating in the picking bank and the dry condition inhibits the bacterial growth, which has been known to create biofilms that are hard to remove with normal cleaning operations.

Any gas suitable for use in food industry may in principle be used, but at present it is preferred to use dried ambient air, ozone or mixtures thereof. Ozone has the advantage of being an effective bactericide, but necessitates the provision of an ozone generator or tank and involves certain well-known health issues for the machine operators. Air on the other hand is readily available and a non-toxic. If wishing to lower the humidity of the air, this may be achieved simply by heating air taken from a cold storage room, which is normally always found in a poultry processing facility, but it is of course also possible to use a dehumidifier.

If the air is heated to a temperature above 80 degrees Celcius prior to being passed along the inlet path, this will result in a heating of the picking bank, which may be sufficient to kill off at least some bacteria. Like advantages will of course be associated with heating gasses or mixtures of gasses and air.

The flow of gas or air along the inlet path may be achieved in numerous ways as will be readily imaginable to the skilled person, one way being to use a compressed gas or compressed air. When released from the pressure tank or compressor, the pressure will cause a propulsion of the gas or air, which may be sufficient to drive it along the entire length of the picking bank. When using a mixture of different gasses/air one may be compressed and used for propulsion of the other or the pressure may be used for achieving a proper mixing. Propulsion may, however, also be achieved or aided by the use of a ventilator and the direction of the flow may be control by means of deflectors or simply by shaping the picking bank appropriately.

As there is no longer a need for housing the drive mechanism in a hermetically sealed housing, the gas or air can simply be led along a surface of the cover member, but it is still considered advantageous to use a picking bank with a closed hollow cross-sectional configuration and to let the gas or air flow through the picking bank via the hollow. To achieve optimum protection, drying and possible sterilization of the drive mechanism it is preferably arranged substantially entirely in the hollow in the cover member, but due to its size the motor will usually have to be arranged outside the cover member.

Regardless of the design of the cover member, it may be advantageous to inject the gas or air through an inlet at a first end of the picking bank and/or extract the gas or air through an outlet at a second end of the picking bank. This is particularly so when using gasses, not least ozone or like gasses involving a potential health risk for machine operators, since it eases the collection of used gas, but when it is allowed to exit via the axle openings it will normally not be possible to recollect all of the gas.

Recollected gas or air may be returned to the inlet and reused directly or send to a processing station for conditioning, sterilisation, concentration and/or mixing with gasses/air from different sources.

The invention as described above may be used with any type of picking bank, regardless whether the picking heads are driven by a series of mutually engaging gear wheels, by a belt drive or by individual motors. A drive mechanism based on gear wheels is, however, relatively complex and therefore particularly benefits from the decreased need for maintenance and repair. It is noted that in this, the wording "drive mechanism" is primarily intended to cover gear wheels, belts, chains, sprockets, pulleys, bearings etc. located on the inner side of the cover member and used for driving the rotation of the picking heads, while the actual motor is often located at a distance. However, if using a series of small motors connected directly to the axles of the individual picking heads, the axle and motor may also be considered part of the drive mechanism, which has to be protected against deterioration.

BRIEF DESCRIPTION OF THE DRAWINGS

In the following the invention will be described in closer detail with reference to the drawing showing embodiments of the invention:

FIG. 3b is an enlargement of the detail marked B in FIG. 3a.

DETAILED DESCRIPTION OF THE INVENTION

Figure 1:
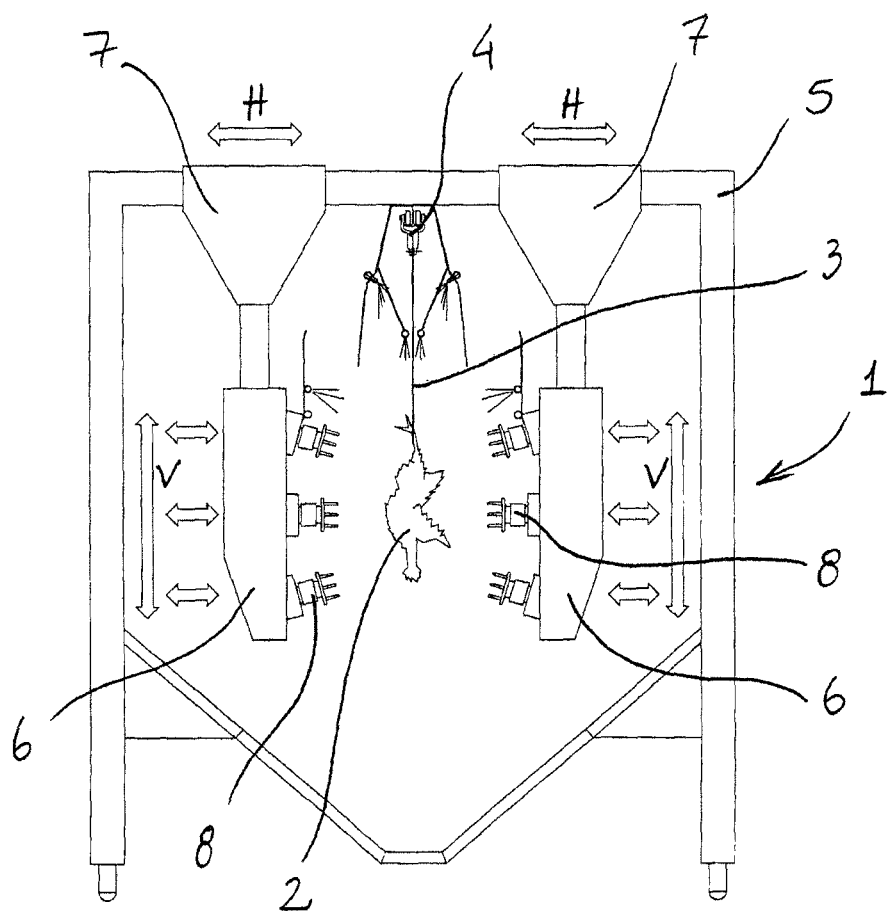
FIG. 1 is a schematic end view of a poultry defeathering apparatus.

A poultry defeathering apparatus 1, as shown in FIG. 1, is part of a poultry processing line in which killed birds 2 are fed to the apparatus suspended from shackles 3 in an overhead conveyor 4. Prior to the feeding into the apparatus the birds have usually passed through scalding equipment (not shown), where hot water has been applied to loosen the feathers and facilitate their subsequent removal from the carcasses.

The poultry defeathering apparatus 1 comprises a frame 5 having at least four uprights and at least two horizontal girders, where each girder extends horizontally between a pair of uprights. The plucking part comprises two substantially identical, but mirrored, defeathering assemblies 6, which are mounted on supports 7 that are slidable along the girders in directions of arrow H. The individual defeathering assembly 6 can adjust its positioning in the vertical direction by sliding up or down on the support 7 in direction of arrow V. As an alternative girders can be slidable on the uprights in order to adjust the vertical position of assemblies 6. The two defeathering assemblies 6 are arranged on opposite sites of the conveyor 4 so that picking heads 8 can contact the bird surface simultaneously on both sides of the suspended birds 2. As is well know to the skilled person, poultry defeathering apparatuses of this type are normally made with series of picking heads arrange on a row, such that each part of the bird 2 passes several picking heads on its way through the apparatus. It is therefore to be understood that each of the picking heads 8 shown in FIG. 1 represents a row of picking heads extending into the plane of the drawing, such a row of picking heads usually being part of a picking bank having from 6 to 24 picking heads. Known defeathering apparatuses presently have up to 176 picking heads in total.

Each of the defeathering assemblies 6 shown in FIG. 1 may be made as one coherent picking bank with a common drive mechanism (not shown) or it may be a group of individual picking banks arranged adjacent to each other, possibly enclosed in a common housing.

Figure 2:
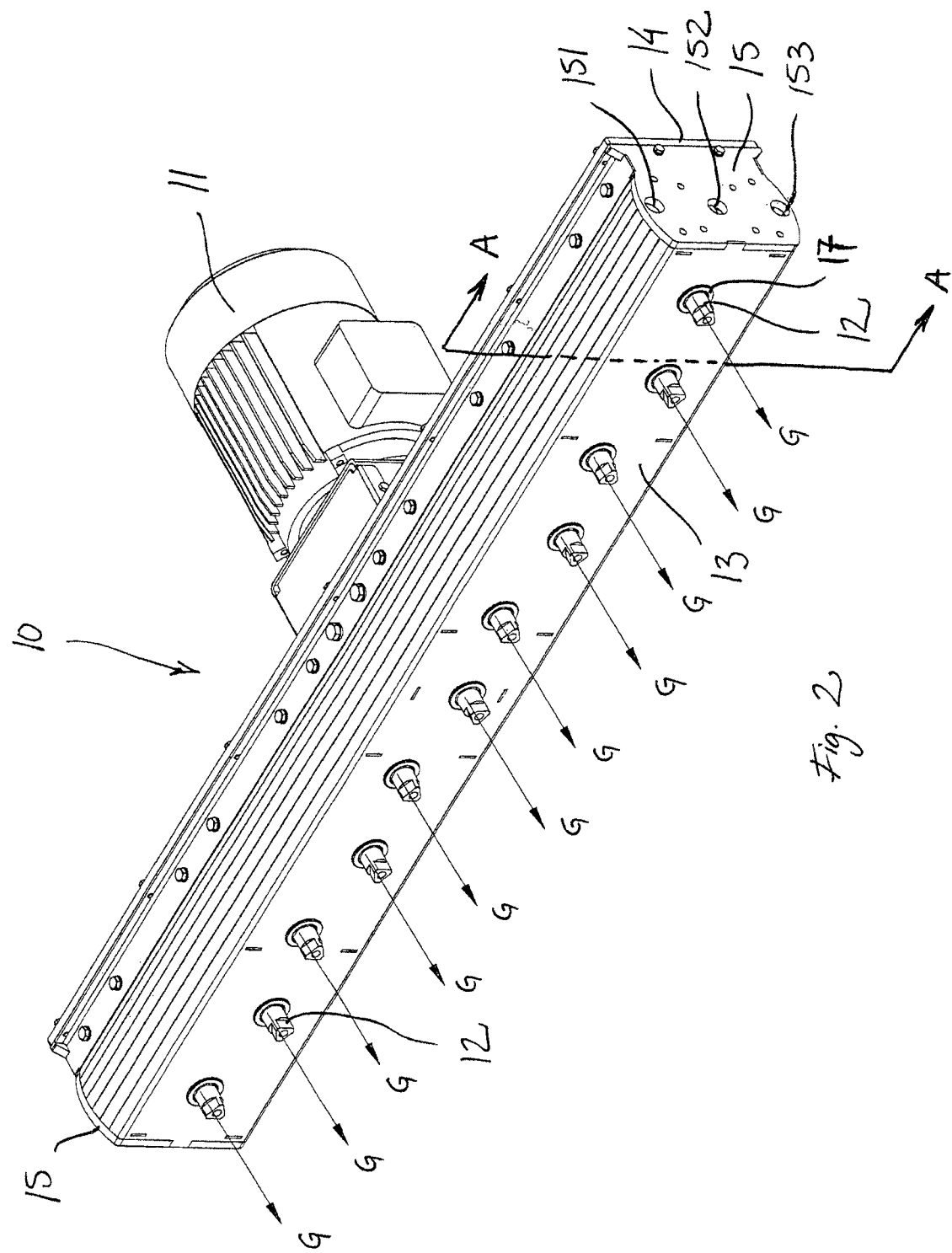
FIG. 2 is a perspective view of a picking bank.

An example of a picking bank 10, which is designed for being used in a group, is shown in FIGS. 2 and 3. This picking bank has its own motor 11 for rotating axles 12 projecting through openings in a cover member 13, the picking heads being removed for giving a better view. The cover member 13 is attached to a support plate 14 so that together they form a hollow tube-shape housing, which envelopes the drive mechanism used for rotating the axles 12. The ends of the picking bank are closed off by end plates 15 and the upper and lower sides of the housing are both curved to allow neighbouring picking banks to be arranged closely side-by-side, while still allowing an adjustment of their mutual positions and angles.

In this embodiment the drive mechanism 16 is a series of mutually engaging gear wheels, one of which is driven by the motor 11, but it is to be understood that the invention also applies to picking banks, where the drive mechanism is of the widely used belt type, driven by chains or where several smaller motors are associated with each picking bank.

The end plate 15, which is seen to the right in FIG. 2, is provided with three openings 151, 152, 153, of which the centre opening 152 is intended for use when mounting the picking bank in a poultry defeathering apparatus, a pin or like projection on the apparatus simply being inserted in the opening. One of the other openings, in this case the uppermost opening 151, is used for attachment of a position adjusting device such as a hydraulic cylinder, which may push or pull on the upper side of end plate 15, thus causing the picking bank to turn about the centre opening 152 and changing its angle of operation. The last opening, in this case the lowermost opening 153, gives access to the inner side of the picking bank and serves as an inlet for gas or air.

In the following, for the sake of simplicity, the term "gas" will be used as a common name for all gasses, air and mixtures unless a different intention is clearly stated.

Figure 3A:
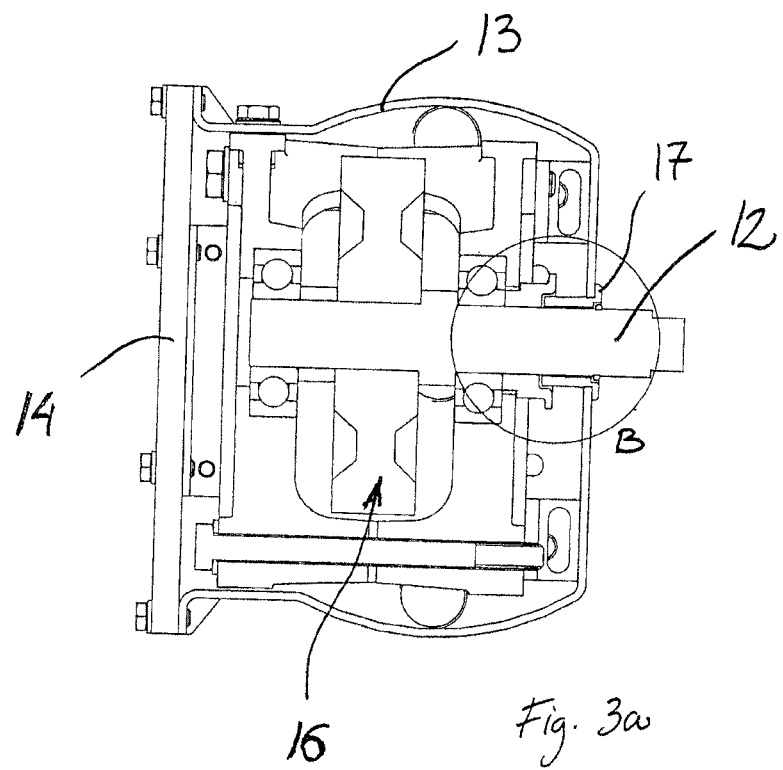
FIG. 3a shows a cross-section of the picking bank in FIG. 2 as marked by the line A-A.

As may be seen in FIG. 3a the drive mechanism 16 takes up most of the space delimited by the cover member 13 and the support plate 14, but it is nonetheless possible for gas to pass through it in the length direction. The gas may then be extracted via an opening (not shown) in the end plate 15 opposite the one comprising the inlet opening, but some of the gas is allowed to escape via openings between the axles 12 and the axle bearings 17 as illustrated by the arrows G in FIGS. 2 and 3b. These axle openings will normally have a width of less 0.5 mm, since the bearings must still be able to support the axles, but the optimal size will depend on the types of axles, bearings and picking heads used and on the kind of birds processed and will therefore have to be determined by experiments. Likewise, the bearings and/or axles may be provided with profiling, such as longitudinal canals, for controlling and optimizing the gas flow. It is also noted that the openings form a labyrinth as may be seen from the path followed by the gas or air in FIG. 3b. This is to help prevent the ingress of dirt and water, particularly during cleaning of the outer side of the picking bank.

The more gas or air that exits via the axle openings, the less feathers, dirt and water will be able to penetrate into the picking bank this way, but it may be difficult to achieve a satisfactory flow at the axle openings furthest from the inlet if all gas or air exits via the axle openings. It may therefore be advantageous to provide a primary flow within the picking bank running from the inlet openings 153 in one end plate 15 to a outlet at the opposite end plate and/or to have several inlets distributed over the length of the picking bank. The extend of the problem with respect to distribution of the gas will of course depend on the design of the picking bank, not least its length, and the provision of inlets etc. will thus have to be designed accordingly.

To achieve the best possible protection against ingress of water and against feathers and dirt penetrating into the picking bank 10 a constant overpressure is kept on the inner side. It is, however, also possible to allow natural variations in the pressure to result in the over-pressure being lost from time to time and to then rely on the reestablishment of the over-pressure being able to blow out any undesired matter. Likewise, short regular increases of the pressure may be used for cleaning purposes, possibly in combination with the introduction of a cleaning agent, either liquid or gaseous.

Figure 3B:
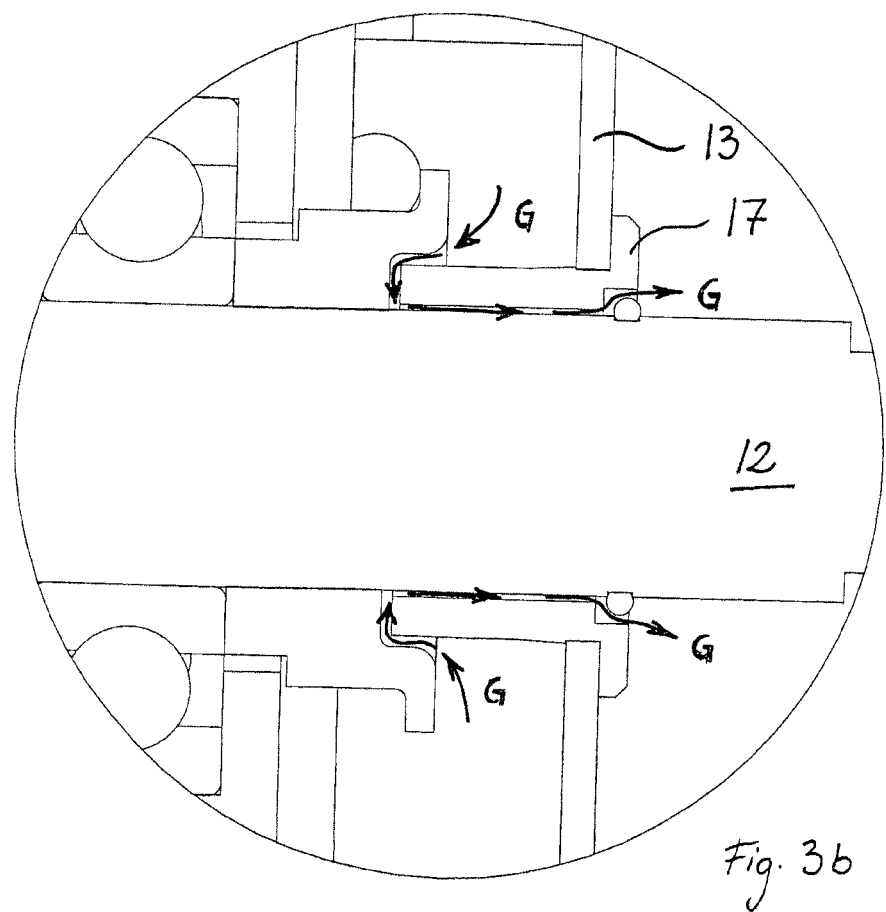

In the embodiment in FIGS. 2, 3a and 3b the picking bank is of a closed hollow configuration, which will in itself form a flow path, but the invention also relates to picking banks of a more open configuration. As an example the picking bank could be made without the support plate 14 and/or the cover member 13 could be plane. In such cases the gas could for example be blown onto the back side of the picking row in a direction substantially in parallel to the arrows G in FIG. 2 and any gas not penetrating through the axle openings could then simply be left to escape via the sides and ends of the picking bank. The gas could, however, also be injected from the end as in FIG. 2, and the picking bank could then be provided with one or more fin-like baffles or deflectors serving to direct the flow of gas in the desired direction.

As will be understood by the skilled person, the flow pattern of the gas will depend highly on the direction and speed with which it meets the picking bank and these factors may therefore be adjusted to achieve the desired flow pattern for a given design of the picking bank. It is, however, preferred that the gas travels at least at 10 m/s, but not above 25 m/s. Ventilators may be used to achieve the desired speed of the gas, but it is also possible to pressurize the gas either by a compressor provided in connection with the poultry defeathering apparatus or by using gas stored in pressure tanks.

With a picking bank of the type shown in FIGS. 2, 3a and 3b it has proven expedient to use cold air taken from a cold storage room and to inject it via the inlet opening 153 at 300 l/min, thereby reaching an over-pressure of 200-250 mbar inside the picking bank. Depending on the number of axles, the size of the opening at each axle and the general tightness of the picking bank it may, however, be necessary to use more air or gas to maintain the over-pressure. In other cases it may be acceptable to operate at a lower pressure, but it is preferred to always keep the pressure at 150 mbar or more above atmospheric pressure.

The gas may in principle be any gas approved for use in food industry, such as for example ozone or carbon dioxide, but due to availability and price it will often be expedient to use ambient air. In that case the gas supply may simply be a ventilator, directing ambient air into the picking bank, but due to the use of water in the scalding process the ambient air even at the outer side of a poultry defeathering apparatus will often be relatively humid. If relying only on the ability of the gas to blow away feathers, dirt and moisture and/or on an overpressure preventing ingress, this may not be a problem, but it is preferred that the gas is having a low relative humidity. This may be achieved simply by using air taken from a dryer area or by heating the air to decrease its relative humidity. As an example, if starting from ambient air at a temperature of 20 degrees Celcius and heating it to 60 degrees Celcius its relative humidity will drop from 100% to 13%, or, put in other words, it will be able to humidify up to more than seven times its original water content. Heating the gas has the further advantage that at least some of bacteria will be killed and if heating the gas to 84 degrees Celcius or more, the need for using antibacterial cleaning agents can often be eliminated. Running the apparatus at such high temperatures may, however, cause deterioration of the materials used and it may therefore be preferred to apply hot gas only during shorter intervals or as part of a cleaning operation, when the apparatus is not running.

Other types of gas will have to be delivered in tanks or generated in suitably equipment, such as an ozone generator, and it is to be understood that such gases may in some instances also be heated.

The provision of suitable equipment for leading the gas to and from the picking banks will depend on the type of gas used and of the type and position of any compressors, tanks, ventilators, heaters etc. used in the system, but as it can be based on common tubing and pipe systems this will involve no problem to the skilled person.

Apart from what have been described above other details of the picking bank, including the choice of materials, may remain as in the prior art.

The invention claimed is:

1. A method for operating a poultry defeathering apparatus, where a drive mechanism is used for rotating a plurality of picking heads of a picking bank, each of said picking heads being mounted at an outer side of a cover member on an axle projecting through an opening in the cover member and being supported by a bearing, and said drive mechanism being arranged on an inner side of the cover member opposite the picking heads, characterized in that gas or air is caused to flow along an inlet path on the inner side of the cover member and onwards to the drive mechanism, and that the gas or air has a lower relative humidity than the air surrounding the picking heads when the apparatus is in operation.

2. A method according to claim 1, where the flow of gas or air is so as to cause an over-pressure on the inner side of the cover member, which is, preferably at all times, higher than the pressure on the outer side.

3. A method according to claim 1, where the gas or air is chosen from the group consisting of: dried ambient air, ozone and mixtures thereof.

4. A method according to claim 1, where the gas or air is heated to a temperature above 80 degrees Celcius prior to being caused to flow along the inlet path.

5. A method according to claim 1, where pressurized gas or air is used.

6. A method according to claim 1, where the picking bank is made with a closed hollow cross-sectional configuration and where the gas or air is caused to flow through the picking bank via the hollow.

7. A method according to claim 1, where gas or air is injected via an inlet opening at a first end of the picking bank and/or where gas or air is extracted through an outlet opening at a second end of the picking bank.

8. A picking bank for use in a poultry defeathering apparatus comprising at least one cover member, a plurality of picking heads and a drive mechanism for rotating the picking heads, each of said picking heads being mounted at an outer side of the cover member on an axle projecting through an opening in the cover member, said axle being supported by a bearing, and said drive mechanism being arranged on a inner side of the cover member opposite the picking heads, characterized in that it further comprises one or more flow inducers adapted for directing gas or air along an inlet path on the inner side of the cover member towards the drive mechanism and that an intake adapted for leading gas or air to the one or more flow inducers is directed away from the picking heads.

9. A picking bank according to claim 8, further including an inlet opening for gas or air at a first end of the picking bank and/or an outlet opening for gas or air at a second end of the picking bank.

10. A picking bank according to claim 8, where the flow inducer(s) include a ventilator, a compressor and/or a deflector.

11. A picking bank according to claim 8, further including at least one gas or air source, such as an ozone tank or an air compressor.

12. A picking bank according to claim 8, further including a heater for gas or air.

13. A picking bank according to claim 8, where the cover member is made with a closed hollow cross-sectional configuration, said hollow being adapted for serving as a flow passage for gas or air.

14. A picking bank according to claim 13, where the drive mechanism is arranged substantially entirely in the hollow in the cover member.

15. A picking bank according to claim 8, where the drive mechanism includes a series of mutually engaging gear wheels, each being connected to a picking head, and where at least one of the gear wheels is driven.

* * * * *